Oct. 4, 1966 J. H. SCHMID ETAL 3,276,590

FILTER

Filed March 16, 1964 2 Sheets-Sheet 1

INVENTORS
JOHN H. SCHMID
ROBERT H PALMER
BY
Charles L. Lauchheck
atty

Oct. 4, 1966   J. H. SCHMID ETAL   3,276,590
FILTER
Filed March 16, 1964   2 Sheets-Sheet 2

INVENTORS
JOHN. H. SCHMID &
BY ROBERT H. PALMER

Charles L. Lovenhart
ATTORNEY

United States Patent Office 3,276,590
Patented Oct. 4, 1966

3,276,590
FILTER
John H. Schmid, Erie, and Robert H. Palmer, Lake City, Pa., assignors to Zurn Industries, Inc., Erie, Pa., a corporation of Pennsylvania
Filed Mar. 16, 1964, Ser. No. 351,996
22 Claims. (Cl. 210—206)

This invention relates to filters and, more particularly, to filters for water and liquids presenting problems similar to those encountered in water filtration.

The device disclosed herein is a high rate self-contained filter. In appearance and operation, it is similar to a pressure sand type filter but its filter media, treatment, and method of introducing the influent varies from conventional design. An improved surface backwash unit is employed The filter is primarily for the purpose of turbidity removal but it is also effective for the removal of iron and/or manganese and similar contaminants. The filter is completely automatic in operation; the only servicing required is the periodic replenishing of the treatment chemicals.

Because of the type of filter media and the type of treatment, the pressure drop through the filter is very low even at the high flow rates used. Due to the high flow rates possible, the space required and, also, installation cost is minimum. While the filter finds its greatest use in raw water treatment, it also is applicable to industrial wastes, sewage plant effluent, and even in process liquors. The design lends itself to many arrangements, making it adapatable to almost any system. It can be furnished in single or multiple units, for continuous or intermittent operation, and in a wide range of sizes. It may be completely automated.

The filter has a retention chamber and a filter chamber. In the retention chamber, an incipient flocculation occurs following the addition of a coagulant introduced to the liquid prior to its entry to the retention chamber.

After the liquid leaves the retention chamber and before it enters, the filter chamber, a polyelectrolyte is added. The liquid entering the filter chamber is deflected by the baffle plate at the top of the filter chamber and the liquid flows from the baffle plate to the top surface of the filter media. It flows down through the filter media, having its turbidity removed, and the liquid passes out through the porous bottom or through the manifold, as the case may be, to the exit.

An alternate path is provided through the filter media. This is down through the vertical pipe and to the branches and thence through the filter material. The plates on the ends of the branch pipes intercept the granules of the filter material as it settles back in the bed after each back wash cycle. Thus, there is a pocket of substantial size in the filter material at the end of each branch pipe. These pockets in the filter media provide a surface area of substantial size which will not become clogged as readily as if only a small area were presented. Thus, as the top surface of the filter media becomes clogged by turbidity removed from the liquid and the pressure differential between inlet and outlet increases due to the turbidity continuing to clog the filter, more and more liquid is forced through the central vertical pipe and out the branch pipes, where a fresh surface of filter is presented to the turbid liquid.

Because of these pockets presenting new areas of filter material surface to the turbid liquid as the top surface becomes clogged, the filter can be operated appreciably longer between back wash cycles than with a plain filter without the central pipe.

During back wash wherein filter material might otherwise clog the branch pipes and central pipe, filter material is kept out by tapping off some of the liquid from the rotating agitator arm by way of the injector pipe and directing the liquid tapped off thereby into the central vertical pipe. This liquid will be directed to the closed bottom of the vertical pipe by the injector pipe. It will flow out of the branch pipes, thereby keeping the back wash water carrying filter material from entering. It will also prevent filter material from entering the top of the pipe.

During back wash, the filter bed is expanded approximately twenty-five percent. Thus, the filter material rises above the rotating arm. The arm rotates and agitates the material by the jet action of liquid flowing from the nozzles on the arm. At the end of the back wash cycle, the filter bed settles to its original height. The settling particles of filter material that settle adjacent the ends of the branch pipes are intercepted by the plates attached to the tops of the ends of the pipes. The filter material falls onto these plates and the space below the plates is shielded and a pocket is developed in the granular filter material below each plate. Obviously, this pocket presents a considerably greater area to the liquid escaping from the ends of the pipes than if the pipes discharged directly into the filter media. The entire surface area defining these pockets is available to collect turbidity.

It is, accordingly, an object of the present invention to provide an improved filter.

Another object of the invention is to provide an improved compartmented filter tank.

Still another object of the invention is to provide an improved combination filter and backwash unit.

A further object of the invenion is to provide an improved filter in combination with a control therefor.

A still further object of the invention is to provide a filter which is simple in construction, economical to manufacture, and simple and efficient in operation.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Now with more particular reference to the drawings, the filter comprises the single integal compartmented vertical filtration chamber.

Figure 1:
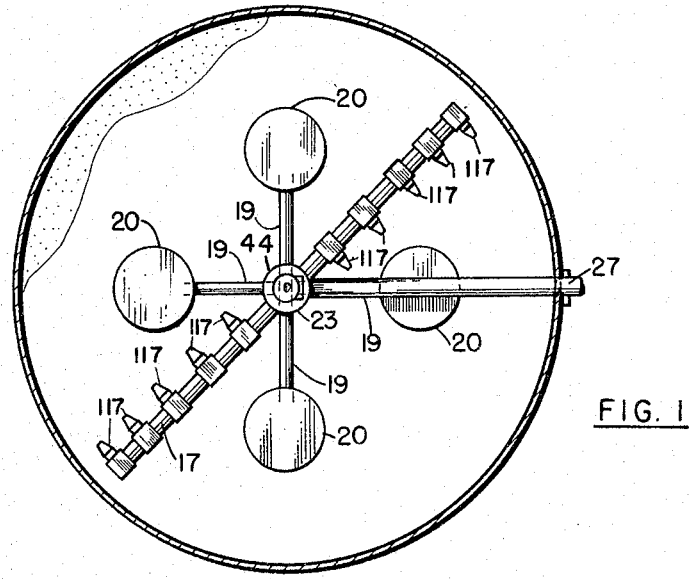
FIG. 1 is a cross sectional view of a filter according to the invention taken on line 2—2 of FIG. 2.
Figure 2:
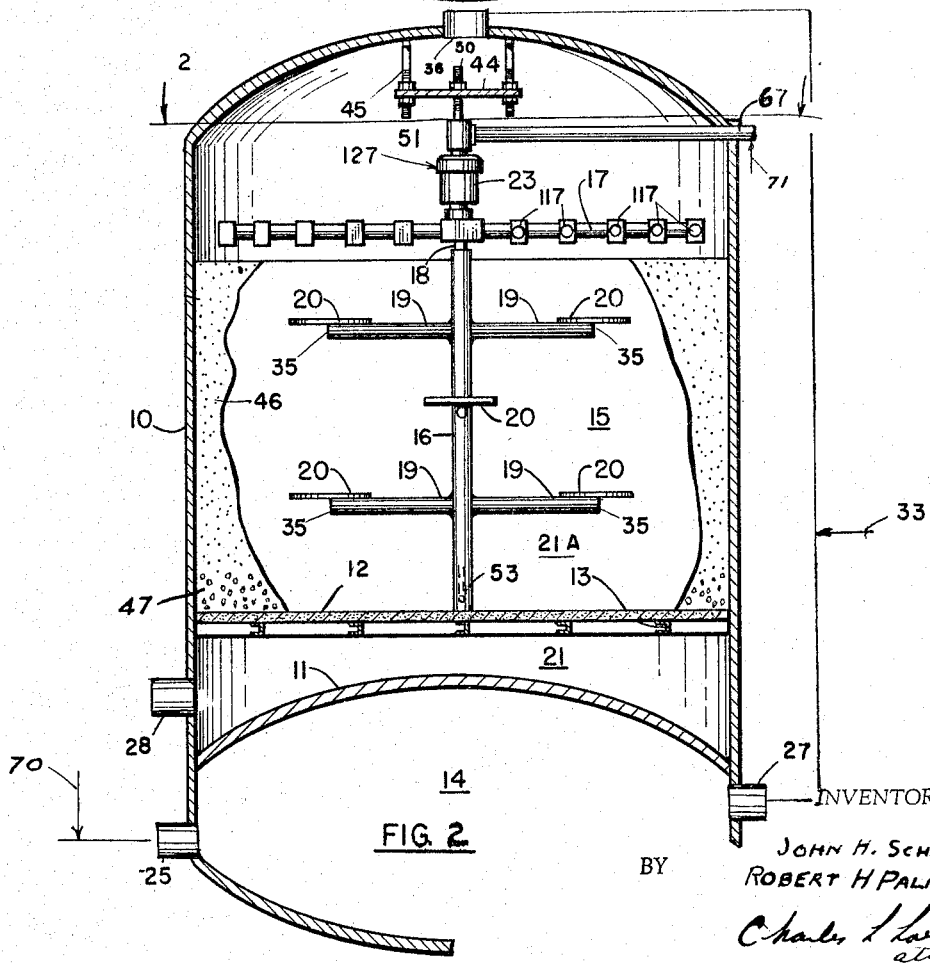
FIG. 2 is a longitudinal cross sectional view of the filter shown in FIG. 1.

Referring now to the embodiment of the invention shown in FIGS. 1 and 2, the filter disclosed herein made up of what amounts to two tanks in one. That is, a tank 10 is divided into compartments 14 and 15. These compartments could be separated from each other and actually be contained in two separate tanks completely independent of each other and connected by a pipe running from an outlet 27 to an inlet 36.

The filter configuration

Structurally, the filter shell is designed in accordance with pressure vessel requirements. It is usually of carbon steel coated for corrosion protection but can be of stainless steel or other corrosion resistant materials. The top and bottom are dished heads; the top head may be flanged for easy removal and, also, fitted with a manhole for ready access. A partition 11 between the upper and lower compartments 14 and 15 is an ellipsoid so that the structure is sound in the event of any unexpected high differential pressure between the two compartments. The injector and surface wash devices are of corrosion resistant materials. The filter media is supported on a large pore, non-clogging type of underdrain or porous false bottom 12 which is itself supported by a rigid framing integral with the shell designed to support full line differential pressure.

The tank 10 is closed at the top and the bottom. The tank is, in effect, divided into three compartments 14, 15, and 21. The partition 11 divides the tank into the lower compartment 14 and the upper compartment 15. The partition may be welded in place. The false bottom 12 made of porous material is supported on rails 13. This provides an open space 21 between the porous false bottom 12 and the partition 11. The partition 11 is dished upwardly to give it strength.

The filtration chamber or compartment 15 is the heart of the unit in which the application of improved filtration principles and treatment and improved backwash principles provides filtration rates and quality of effluent well in excess of that of any packaged filter of this type previously available.

Raw influent enters the lower retention chamber or compartment 14 along with a coagulant from a chemical treatment tank indicated at 70, by way of an inlet 25. An incipient or pinpoint flocculation occurs in the retention chamber 14 as a result of the prior addition of the coagulant. The treated fluid then flows out of the compartment 14 by way of the outlet 27 to inlet 36 and flows into the top of the filtration chamber 15. A polyelectrolyte from the chemical treatment tank or chamber 33 may be added to the water as it flows through the outlet at 33. This addition is controlled to balance the zeta potential of the minute flocs and particulate matter for maximum adhesion to the filter media 46. The filter media 47 adjacent the bottom is a rather coarse graded anthracite. The filter media 46 which makes up approximately ninety per-cent of the bed is somewhat finer.

The grains of the media 46 leave passageways for fluid flow which are very large relative to the solids in the fluid. Thus, the separation is not by straining but is affected primarily by the adhesion of the treated particles to the anthracite, the treatment having established a strong attraction between the two solid phases. The tendency for rapid blinding of the top layer of anthracite is therefore eliminated and excellent penetration of particulate matter into the bed occurs. The large flow passages also keep shear stresses on the occluded matter at a minimum, resulting in a greatly reduced tendency for solids breakthrough.

The water flows from the inlet 36 downwardly through the filter media 46 through the media 47 and porous false bottom 12 to an effluent outlet 28.

The injector is made up of a vertical pipe 16 which is supported on the center of the false bottom 12. The pipe 16 is open at its top, closed at its bottom, and has branch pipes 19 connected to it and communicating with the inside of it. The branch pipes 19 are open at their outer ends and have disk shaped plates attached to the top surfaces of the pipes 19 at the outer ends. The branch pipes 19 terminate approximately two-thirds of the way between the pipe 16 and the inside periphery of the tank 10. This distance may be adjusted, depending upon the characteristics of the particular filter material utilized.

The flow of water entering the top of the filter through the inlet 36 will flow down through the filter material toward the porous partition or false bottom 12 in two different paths. (1) It will flow from the inlet 36 and splash on a baffle plate 44 and be diverted over the entire top surface of the filter media 46; and (2) Some of the water will enter the upper end of the pipe 16 and flow down through it and out through the ends of the pipes 19 at 35. Thus, water flowing from the top surface of the filter media 46 and, also, water flowing from the ends of the branch pipes 19 through the filter material will flow down through the porous false bottom 12 and into chamber 21 and out through the outlet 28.

The injector made up of the vertical pipe 16 and branch pipes 19 provides an alternate path through the filter media which distributes flow to all sections of the filter bed so that the whole bed volume is utilized. By utilizing the entire bed of filter media, the injector not only allows longer filter runs between backwashing but permits a rather high degree of overtreatment of the influent to accommodate a wide degree of turbidity variation in the influent.

As the surface of the filter media 46 becomes contaminated with solids strained from the influent water, a slight pressure differential is set up between the surface and the void areas under plates 20 which causes a portion of the influent to enter the vertical pipe 16 and to flow to the clean void areas. This allows a greater portion of the filter media to retain the solids (flocs) before an maximum high pressure differential can occur as would be the case if only the upper portion of the filter media accumulated all the solids.

The result is a filter which operates efficiently at flow rates in excess of 15 g.p.m./sq. ft. of filter surface area, produces practically a polished effluent, exhibits an extremely low pressure drop, holds many times the quantity of particulate matter which can be retained by a pressure sand filter, and does not require minute adjustment or control of the operation.

*Backwash*

The filter is backwashed by conventional reversal of flow; however, a surface wash unit 127 of the rotating jet type is located just above the filter bed and creates a powerful scouring action on the media during backwash.

Complete turnover of the bed and exposure to the jets are accomplished in a short interval of time. A unique innovation on the surface wash unit conditions the injector to keep it operating at full efficiency. The result is a clean filter with minimum loss and water usage for backwash and no tendency for agglomeration of the anthracite grains.

*The surface wash unit*

The surface wash unit 127 is made up ow a hollow rotating arm 17 which is rotatably supported on a bearing 23 at the top of the filter. The bearing 23 is carried by the baffle plate 44 which is attached to the tank 10 by threaded rods 45. The baffle plate 44 may be in the form of a circular dish with an upwardly extending flange. A pipe 67 communicates with the inside of the bearing 23 and the arm 17. Power for the rotating filter arm 17 is supplied by water jets from nozzles 117 which project outwardly and rearwardly. While the arm 17 is above the filter media during filtering, the filter media is expanded during backwash. During backwash, the granular material is expanded or lifted by the water flowing up through the false bottom 12 and up through the granular material. Therefore, the granular material rises above the rotating arm 17 and when the jets from the nozzles 117 cause the arm to rotate, it actually rotates in the media. These jets agitate the filter media 46 as the arm rotates. The filter media below the surfae is further agitated by backwash water issuing from the vertical stand pipe 16 and its branches 19. The pipe 16 and branches 19 could be made of plastic, metal, or any other suitable material.

The pipe 16 has an open upper end. A jet injector tube 18 extends downwardly from the center of the arm 17 into the vertical stand pipe 16 concentric thereto, but slightly smaller. The injector tube 18 is connected to and receives water from the arm 17 to inject water into the pipe 16 adjacent the bottom thereof.

The pipe 16 has the tubular branches 19 which commuicates with the inside thereof and these branches conduct water from inside the pipe 16 out of the outlet at the ends 35 into the filter medium surrounding it, thereby preventing the entrance of filter medium into the vertical pipe 16 and branches 19 during backwash.

The branches 19 each have a disk or plate 20 supported on its top outer end over the outlet. This disk or plate 20 forms a roof over the outlet end of the pipes and when the anthrafilt filter medium settles after having been agitated and cleaned during a backwash cycle, these disks prevent the filter medium from settling in an area directly around the outlet end of the pipe so that a pocket is formed around the pipe. Thus, a cavity is provided at the outlet enr of the branches 19, through which water from the branches 19 can flow during the filter cycle. A large surface area is thereby provided at the end of each branch for easy penetration of the flow into the filter media.

The retention compartment 14 has sufficient volume to retain the fluid from the inlet 25 for approximately one-half to one minute during operation. The water flows from the inlet 25 to the chamber 14 which may be baffled in a suitable manner and to the exit pipe 27 and thence to the inlet 36 into the chamber 15, down through the filter media by the two alternate paths referred to, and through the porous false bottom 12 and through the outlet pipe 28.

During backwash, the pipe 28 and pipe 67 will be connected to a suitable supply of water suitable for backwash purposes. The inlet 36 will be connected to a drain. The water will enter the chamber 21 from the outlet pipe 28 and will thence flow up through the filter media 47 and 46 to the inlet 36 and thence to a drain.

Water entering the pipe 67 will flow through the hollow bearing 23 and thence divide, part flowing through the arm 17 and out the nozzles 117. The other part enters the injector tube 18, flowing out its lower end into the vertical pipe 16 and thence out its ends 35 and out the top of the pipe 16.

In order to improve the action of the surface wash unit, it may, in some cases, be desirable to insert a detergent at 71 during backwash. This may be done by a suitable mechanism familiar to those skilled in the art.

Thus, mechanism 71 would inject detergent into the liquid entering the arm 17 and injector tube 18 during backwash. The detergent and water will flow out the nozzles 117 and some may flow out the ends of the branch pipes 19 and out the upper end of the pipe 16. This detergent mixed with the water will improve the cleaning action of the filter media.

The detergent will be shut off prior to shutting off the inflow of backwash water through the chamber 21 so that the backwash water can rinse the detergent from the filter media prior to the beginning of the following filter cycle.

Figure 3:
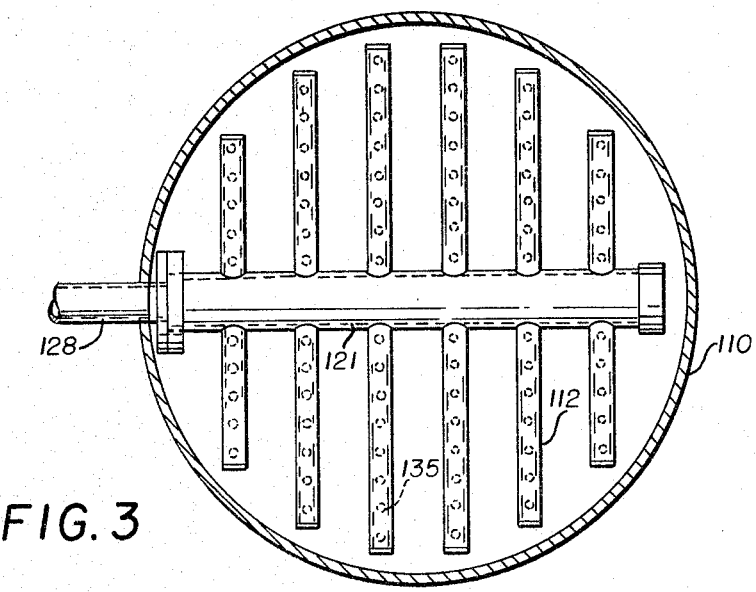
FIG. 3 is a cross sectional view taken on line 3—3 of FIG. 4.
Figure 4:
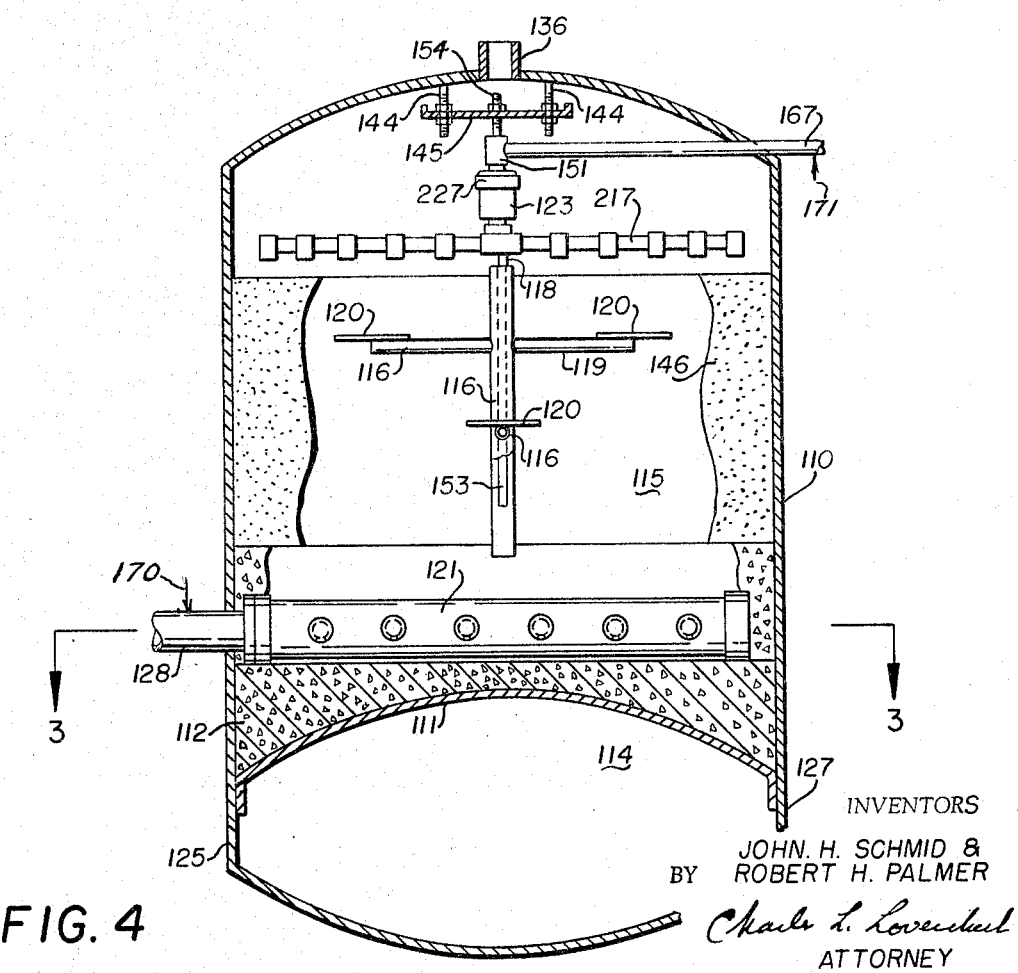
FIG. 4 is a longitudinal cross sectional view of an alternate of the filter constituting another embodiment of the invention.

The embodiment of the invention shown in FIGS. 3 and 4 is generally quite similar to the embodiment shown in FIGS. 1 and 2 with the exception that a false bottom similar to the bottom 12 and a chamber similar to chamber 21 in FIGS. 1 and 2 are not provided. Instead of the false bottom and chamber, concrete 112 is placed on top of a partition 111 and a manifold 121 rests on the upper surface of the concrete. It is not necessary to have a porous bottom in some instances.

The embodiment of the invention shown in FIGS. 3 and 4 discloses a tank 110 similar to the tank of FIGS. 1 and 2. The tank has a retention chamber 114 and a filtration chamber 115. The manifold 121 is specifically shown in FIG. 3 and is connected to an outlet pipe 128. Concrete 112 eliminates the need of a supporting structure.

The agitating arrangement is identical to the corresponding arrangement in FIGS. 1 and 2. It is made up of a rotating arm 217 which is fixed to the rotatable part of a bearing 227. The fixed part of the bearing 227 is fixed to a baffle plate 145 by means of a bolt 154. The baffle plate 145 is, in turn, supported on the tank by means of a bolt 144 in a manner like that shown in the embodiment of FIGS. 1 and 2. A backwash pipe 167 communicates with the inside of a rotating bearing 123 and introduces water through the arm 217 to the jets and, also, to a pipe 118 out an exit end 153 during the backwash cycle. Branch pipes 119 are welded to the pipe 116 and communicate with the inside of pipe 116. The have plates 120 attached to their ends which extend beyond their ends and form a roof over the outlet from their ends.

During the forward filtering cycle, liquid from a source of water to be filtered is introduced at an inlet 125. It will have had a chemical added at 170 prior to entry to the compartment 114 and as it flows through the compartment 114, it generates a floc. It then flows from the outlet 127 of the compartment 114 to the inlet 136 at the top of the chamber 115. The water entering the inlet 136 impinges on the baffle plate 145 and is dissipated around it and onto the top of the filter material 146. It then flows down through the manifold 121 through the inlet openings 135 and thence out through the outlet 128.

During backwash, a source of backwash water is connected to the outlet 128 and to the pipe 167. The inlet 136 is connected to a drain. The backwash water flows from the outlet 128 through the manifold 121 and out through the holes 135. From thence, the backwash cycle is exactly as in the embodiment of FIGS. 1 and 2.

The detergent addition mechanism disclosed in FIGS. 1 and 2 can be used with the embodiment of the filter shown in FIGS. 3 and 4.

The foregoing specification sets forth the invention in its preferred practical forms but it is understood that the structure shown is capable of modification within a range of equivalents without departing from the invention which is to be understood is broadly novel as is commensurate with the appended claims.

The embodiments of the invention in which an exclusive property or privilege is claimed are defined as follows:

1. A filter comprising
    a tank,
    said tank having granular filter material therein and filling said tank to a substantial depth above the bottom thereof,
    an exit opening from said tank and an inlet opening to said tank for connecting liquid to be filtered,
    said inlet opening being disposed adjacent the top of said tank,
    a vertical pipe open at its upper end supported in said tank at the center thereof and generally concentric thereto,
    and branch pipes attached to said vertical pipe and communicating with the inside thereof and extending outwardly generally perpendicular thereto,
    said branch pipes being open at their outer ends and the outer ends thereof terminating a substantial distance from the inside periphery of said tank,
    said tank being adapted to have liquid flow from said inlet opening to the top surface of said filter material and thence through said filter material to said exit opening,
    said filter further being adapted to have water flow from said inlet opening into said open upper end of said vertical pipe and through said branch pipes and through said filter material to said exit opening.

2. The filter recited in claim 1 wherein
    said tank has a porous partition therein between said inlet opening and said exit opening,
    said filter material being supported on said porous partition, said porous partition dividing said tank into two compartments, said filter being adapted to have said liquid flow from said filter material through said porous partition to said second compartment and thence to said exit opening.

3. The filter recited in claim 2 wherein a rotatable arm having jet nozzles thereon is rotatably supported in said tank and disposed above said filter material and adapted to rotate in a plane generally parallel to the top surface of said filter material when said filter material is in an unagitated condition, said rotatable arm being adapted to have a source of liquid connected to the inside thereof and to said nozzles on said arm for directing liquid from said source of liquid through said arm to propel said arm and rotate it during a backwash of said filter, said exit opening from said tank being adapted to be connected to a source of backwash fluid which will flow from said exit opening to said inlet opening by way of said porous partition during backwash of said filter material.

4. The filter recited in claim 3 wherein an injector pipe is attached to said arm and extends into said vertical pipe concentric thereto and terminates adjacent the bottom thereof whereby fluid from said source is directed into said vertical pipe to flow out through said branch pipes and prevent filter material from entering said pipe and branch pipes during backwash.

5. The filter recited in claim 3 wherein a baffle plate is supported inside said tank below said inlet opening whereby fluid from said inlet opening impinges on said baffle plate and is dispersed through said tank above said filter material.

6. The filter recited in claim 5 wherein said rotatable arm is supported by a bearing member atached to said baffle plate.

7. A filter comprising a tank, said tank being adapted to contain a granular filter material, agitation means in said tank for agitating said filter material during backwash, said agitation means comprising a vertical tubular member supported in said tank and extending generally vertically in said tank, tubular branches attached to said tubular member communicating with the inside of said vertical tubular member and extending generally laterally and terminating in open ends, a hollow arm swingably supported in said tank and adapted to rotate in a generally horizontal plane above said filter material during backwash, nozzle means on said arm for directing fluid inside said arm in a generally horizontal direction, and an injector member connecting the inside of said hollow arm to said vertical tubular member whereby fluid is admitted to said vertical tubular member and through said branches and prevent entrance of filter material to said tubular member and branches.

8. The filter recited in claim 7 wherein a plate like member is attached to the outer end of each said tubular branch and providing a cover extending over the top thereof, said plate like members being adapted to prevent said filter material from settling at the opening in said tubular branches.

9. The filter recited in claim 7 wherein plate like members are attached to said tubular branches and extend outwardly therefrom, said plate like members extending outwardly beyond the outer ends of said tubular branches whereby filter material is prevented from accumulating in the end of said branches.

10. The filter recited in claim 7 wherein means is provided to inject a detergent into the fluid entering said hollow arm during backwash.

11. A filter comprising a tank, said tank including an activating chamber and a filtration chamber, said filtration chamber being adapted to contain a filter media, agitation means in said filtration chamber, said agitation means comprising a hollow arm, means rotatably supporting said arm in said filtration chamber for rotation about a generally vertical axis during backwash, means connecting said activating chamber in fluid flow relationship with said filtration chamber, nozzles on said arm adapted to project fluid in said filtration chamber in generally horizontal streams during backwash, said arm being adapted to be rotated in said filtration chamber by said fluid from said nozzles, an agitation member in said filtration chamber, said agitation member comprising a vertically extending pipe open at its top, closed at its botom, and disposed generally centrally of said filtration chamber, tubular branches on said pipe extending laterally therefrom, said tubular branches being open at their distal ends, and an injector tube attached to said arm connected to the hollow therein and extending downwardly therefrom, said injector tube being adapted to discharge fluid into said virtically extending pipe during backwash whereby fluid flows from said open ends into said filter media.

12. The filter recited in claim 11 wherein said filtration chamber has an inlet at the top thereof and an outlet at the botom thereof, a manifold is connected to said outlet, said manifold having branches extending under said filter media and openings in said branches to receive fluid flowing through said filter.

13. A filter comprising a closed retention compartment, a closed filtration compartment, means connecting said retention compartment to said filtration compartment, said retention compartment being of sufficient size to retain fluid therein for a predetermined period of time to carry out a chemical treatment therein, chemical means adapted to treat said fluid in said retention compartment, granular filter material in said filtration compartment, means to backwash said filtration compartment, said means to backwash comprising a rotatable arm in said filtration compartment, means to admit backwash fluid to said arm, and nozzle means to discharge said backwash fluid from said nozzle means whereby said filter material is agitated and said arm is rotated.

14. The filter recited in claim 13 wherein an agitation member is provided in said filtration chamber, said agitation member having means below the top of said filter material to project said backwash fluid laterally through said filter material, said agitation member being connected in fluid flow relation to said arm whereby some of said backwash fluid agitates said filter material.

15. The filter recited in claim 14 wherein said retention compartment and said filtration compartment are formed by a single tank, said retention compartment being defined on one side by a partition, a porous partition adjacent said partition defining said filtration compartment on one side thereof and an open space on the other side thereof between said filtration compartment and said retention compartment.

16. A filter comprising
a container having an inlet at the top and an outlet at the bottom thereof,
a bed of filter material in said container having a top surface below the top of said container,
means to direct liquid from said inlet to said outlet through a first and a second path into said filter material,
said first path being from said inlet to the top surface of said filter material and through said filter material to said outlet,
said second path having conduit means to direct a portion of said liquid directly to the interior of said bed of filter material to a plurality of positions spaced laterally and vertically from each other, all of which are spaced a substantial distance below said top surface of said material before said liquid of said portion contacts said filter material,
said liquid being adapted to flow from said conduit means through said filter material to said outlet.

17. A filter comprising
a container having an inlet at the top and an outlet at the bottom thereof,
a bed of filter material in said container having a top surface below the top of said container,
means to direct liquid to and from said inlet through a first and a second path into said filter material,
said first path being from said inlet to the top surface of said filter material and through said filter material to said outlet,
said second path having conduit means to direct a portion of said liquid directly to the interior of said bed of filter material a substantial distance below said top surface thereof before said liquid of said portion contacts said filter material.
said liquid being adapted to flow from said conduit means through said filter material to said outlet,
and agitation means in said filter above said filter material,
said agitation means being adapted to have a source of backwash liquid attached thereto,
said agitation means being connected to said conduit means to prevent filter material from entering said conduit means during backwash of said filter.

18. The filter recited in claim 17 wherein
a porous false bottom is provided in said container between said outlet and said filter material.

19. A filter comprising
a container having an inlet and an outlet,
a porous body of filter media in said container between said inlet and said outlet,
first means to admit liquid from said inlet into said container above said body of filter media, whereby said liquid enters the top surface of said body, and flows through said filter media to said outlet,
and second means to admit liquid from said inlet directly into the interior of said body below the top surface thereof bypassing the top surface of said media, and entering said media on the interior of said body, said second means to admit liquid comprising a body having an inlet disposed above the top surface of said media during a filling cycle but below the top surface of said media during backwash, there being a plurality of spaced openings in said second means spaced horizontally and vertically from each other below the top surface of said media whereby said liquid can flow through said second means and through said media to said outlet.

20. The filter recited in claim 19 wherein
said filter is adapted to be backwashed
and means is provided to prevent filter media from said body from entering said means during a backwash cycle.

21. The filter recited in claim 19 wherein
means is provided above said filter media to agitate said body of filter media during a backwash cycle.

22. The filter recited in claim 21 wherein
means is provided to add a detergent to said filter media during backwash.

References Cited by the Examiner

UNITED STATES PATENTS

| | | | |
|---|---|---|---|
| 402,658 | 5/1889 | Davis | 210—276 |
| 446,153 | 2/1891 | Reake | 210—276 |
| 903,385 | 11/1908 | Jewell | 210—80 XR |
| 2,069,621 | 2/1937 | Patrick | 134—25 XR |
| 2,948,400 | 8/1960 | Hagen | 210—277 XR |
| 3,171,801 | 3/1965 | Rice et al. | 210—80 XR |

FOREIGN PATENTS

| | | |
|---|---|---|
| 11,786 | 1898 | Great Britain. |
| 23,906 | 1911 | Great Britain. |

OTHER REFERENCES

Schwartz et al: Surface Active Agents, 1949, Interscience Publishers, Inc., New York, p. 349 relied on.

MORRIS O. WOLK, *Primary Examiner.*

M. E. ROGERS, *Assistant Examiner.*